(12) United States Patent
Galloway

(10) Patent No.: US 7,225,758 B1
(45) Date of Patent: Jun. 5, 2007

(54) HAIR GROOMING DEVICE

(76) Inventor: Eric T. Galloway, P.O. Box 8216, Chattanooga, TN (US) 37414

( * ) Notice: Subject to any disclaimer, the term of this patent is extended or adjusted under 35 U.S.C. 154(b) by 0 days.

(21) Appl. No.: 10/989,441

(22) Filed: Nov. 17, 2004

(51) Int. Cl.
*A01K 13/00* (2006.01)

(52) U.S. Cl. .................................... 119/603

(58) Field of Classification Search ........... 119/603, 119/604, 608, 609, 665; 132/119, 118; 15/322, 15/320
See application file for complete search history.

(56) References Cited

U.S. PATENT DOCUMENTS

| | | |
|---|---|---|
| 3,145,691 A | 8/1964 | Yates |
| 3,721,250 A | 3/1973 | Walter et al. |
| 3,889,851 A | 6/1975 | Kain |
| 3,904,086 A * | 9/1975 | Losenno ............... 222/146.5 |
| 5,649,502 A * | 7/1997 | Frank ...................... 119/665 |
| 6,260,232 B1 * | 7/2001 | Nelson et al. ............ 15/322 |
| 6,263,539 B1 * | 7/2001 | Baig ........................ 15/322 |
| 6,453,848 B1 * | 9/2002 | Hachey .................. 119/602 |
| 6,651,588 B1 * | 11/2003 | Penzimer ................ 119/604 |
| 6,948,451 B2 * | 9/2005 | Bond et al. ............. 119/665 |

\* cited by examiner

*Primary Examiner*—Thomas Price
(74) *Attorney, Agent, or Firm*—Crossley Patent Law; Mark Ashley Crossley

(57) ABSTRACT

A portable device for treating and grooming hair and head, the device has a reservoir for holding various treatment liquids, a flexible tube for delivery, and a brush with interchangeable hair contact means for application. The device also has a switched heater for the liquids and a switched pump for their forced delivery, along with a flow switch in the brush handle.

13 Claims, 3 Drawing Sheets

HAIR GROOMING DEVICE

BACKGROUND OF THE INVENTION

1. Field of the Invention

This invention relates to hair grooming devices and more specifically to a hair grooming device that applies grooming and styling liquids to hair via a brush or comb.

2. Description of the Prior Art

Prior art teaches several devices used in hair grooming, each of which differs significantly in design and application from the present invention. By way of example:

U.S. Pat. No. 3,145,691 issued to Yates on Sep. 9, 1963 discloses a device for grooming dogs, specifically a device that includes forced air hair drying for dogs. The device does not target human use in its design or function and does not dispense liquids.

U.S. Pat. No. 3,721,250 issued to Walter et al. on Mar. 20, 1973 discloses a comb having a handle in which is situated a reservoir for water or other liquid, along with a hot air generating system for generating and blowing hot air on a user. While this device is intended for styling use, particularly style completion, it is not intended to perform the same functions as the present invention and does not have sufficient liquid storage nor the design to do so.

U.S. Pat. No. 3,889,851 issued to Kain on Jun. 17, 1975 discloses a shampoo dispensing device that mixes shampoo with incoming water. The device is not designed to utilize various hair treatments which may color, relax, or otherwise treat hair prior to or after water use, such functions being inherent in many hair treatments and styling endeavors now in use. The device is not equipped with a pump needed for dispensing various hair treatment fluids.

While the above-described devices fulfill their respective and particular objects and requirements, they do not describe a hair grooming device that provides for the advantages of the present invention. Therefore, a need exists for an improved hair grooming device, particularly one that includes all of the advantages of the present hair grooming device. In this respect, the present invention substantially departs from the conventional concepts and designs of the prior art.

SUMMARY OF THE INVENTION

In view of the foregoing disadvantages inherent in the known types of hair grooming device now present in the prior art, the hair grooming device overcomes the above-mentioned disadvantages and drawbacks or the prior art. As such, the general purpose of the hair grooming device, described subsequently in greater detail, is to provide a hair grooming device which has all of the advantages of the prior art mentioned heretofore and many novel features that result in an improved hair grooming device which is not anticipated, rendered obvious, suggested, or even implied by the prior art, either alone or in combination thereof.

To accomplish this, the present hair grooming device comprises a base and a brush connected via a delivery tube. The conveniently lightweight portable base is equipped with a carrying handle. From one end emanates the electrical power cord for plugging into any standard electrical outlet. In one embodiment, the electrical power of standard outlet voltage is utilized. In yet another embodiment, the power unit supplying power to the various functions of the invention is a transformer powered by standard electrical outlet voltage. The delivery tube exits the other end of the base and connects to the brush. The delivery tube is made of plastic tubing or the like or even surgical tubing. The brush handle is fitted with a flow switch for allowing or halting the flow of liquid from a plurality of outlet ports within and behind the bristles of the brush head. Inadvertent flow is prohibited by the spring loaded switch in the brush handle. The switch requires continuous user pressure in order to allow flow. The brush head is interchangeable with respect to a brush bristle fitting and a comb.

The rectangular base of the hair grooming device further comprises a reservoir for holding various liquids used in hair treatment and styling. In the preferred embodiment, the base is about 12 inches long, 4 inches wide and 4 inches high, with a small rectangular projection for delivery tube outlet that preferably rises up to 6 inches high. Other base sizes are utilized for holding less or more liquid or for providing for heavier usage. Liquids typically employed include dyes, conditioners, relaxers or any liquid preparation used for treatment or styling of hair. A further feature of a preferred embodiment is a collapsible bag that is removably inserted into the reservoir. The collapsible bag, similar to those used in some baby bottle dispensation, ensures that all liquid empties from the reservoir. The bags also provide for quick insertion of products utilized. Measurement of product utilized is also enabled by the bags. A depression exists within the top of the base for easy access to the reservoir lid. Downstream of the reservoir, within the base, the heating element that connects the reservoir to the pump, also within the base. The pump draws hair treatment liquid through the heating element and propels it through the delivery tube, then flow switch when open, and thence through the main artery of the brush handle, into the artery branches of the brush head and out the outlet ports. Treatment liquids are thereby be controlled more precisely, either by a professional or a home user. A recirculation line is provided for recirculating liquid flow back to the reservoir when the flow switch is in the off position. More even application is thereby achieved, and messes commonly made during hair treatments are diminished or negated. The reservoir is sufficiently sized to hold most treatments utilized. The heating element provides for not only more comfort but also for the warming needed in proper application of many treatments. Switches are incorporated into the base for controlling both the pump and the heating element.

The hair grooming device is portable, lightweight, inexpensively manufactured, and versatile. The basic design of the device provides for durability and longevity.

Thus has been broadly outlined the more important features of the hair grooming device so that the detailed description thereof that follows may be better understood and in order that the present contribution to the art may be better appreciated.

Numerous objects, features and advantages of the hair grooming device will be readily apparent to those of ordinary skill in the art upon reading the following detailed description of presently preferred, but nonetheless illustrative, embodiments of the hair grooming device when taken in conjunction with the accompanying drawings. In this respect, before explaining the current embodiments of the hair grooming device in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the hair grooming device. It is therefore important that the claims be regarded as including such equivalent constructions insofar as they do not depart from the spirit and scope of the present invention.

A primary object, then, of the hair grooming device is to provide for effectively and more exactly treating hair with a plurality of liquid products.

And, an added object of the hair grooming device is to provide a portable device that is neat, less wasteful, and that heats the liquids to be applied.

An added object of the hair grooming device is to provide liquid storage sufficient for most treatments utilized.

And, it is an object of the hair grooming device to provide interchangeable hair and head contact means.

These together with additional objects of the hair grooming device, along with various novel features that characterize the invention are particularly pointed out in the claims forming a part of this disclosure. For better understanding of the hair grooming device, its operating advantages and specific objects attained by its uses, refer to the accompanying drawings and description.

DETAILED DESCRIPTION OF THE PREFERRED EMBODIMENT

With reference now to the drawings, and in particular FIGS. 1 through 6 thereof, the preferred embodiment of the hair grooming device employing the principles and concepts of the present invention and generally designated by the reference number 10 will be described.

Figure 1:
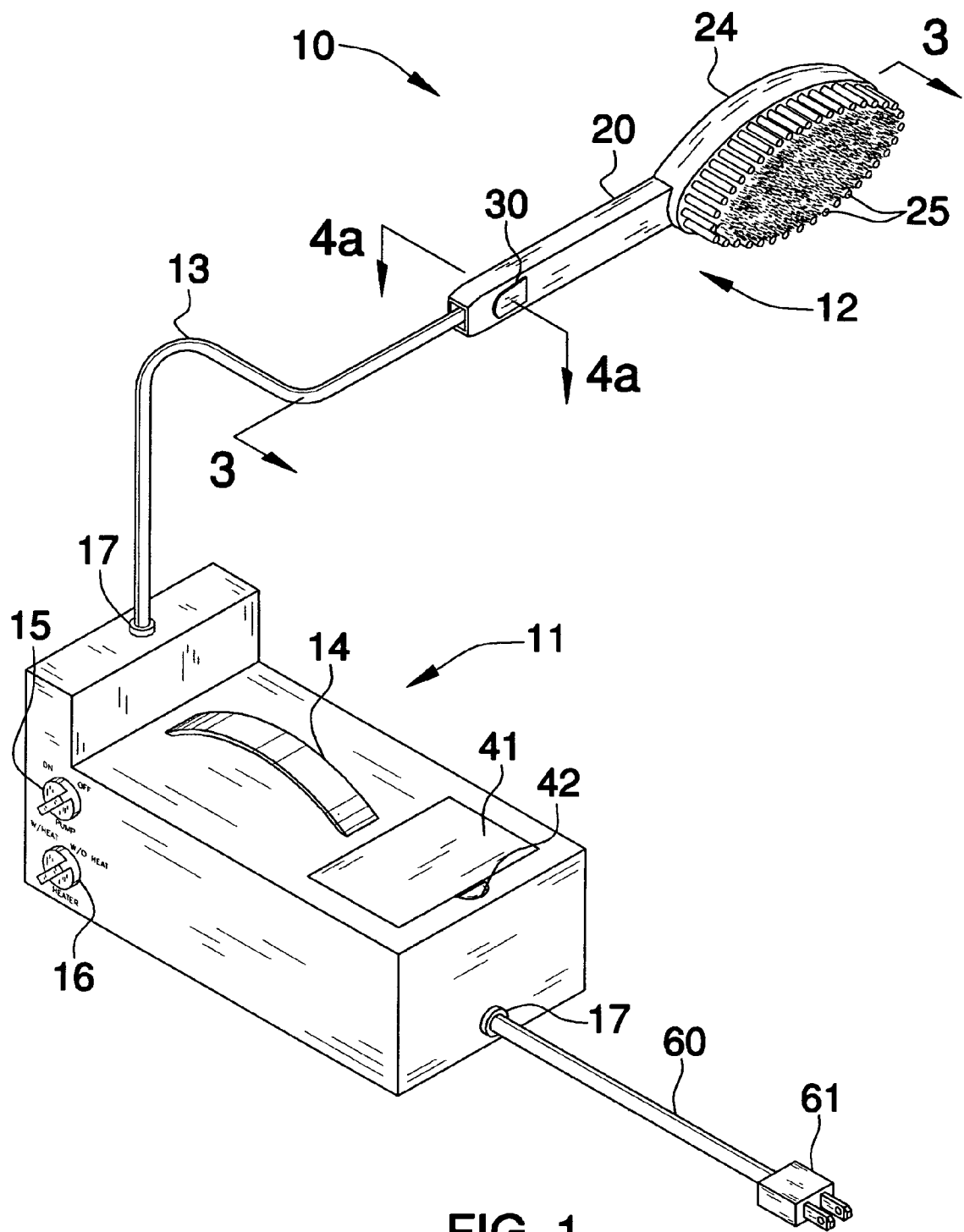
FIG. 1 is a perspective view of the invention.
Figure 2:
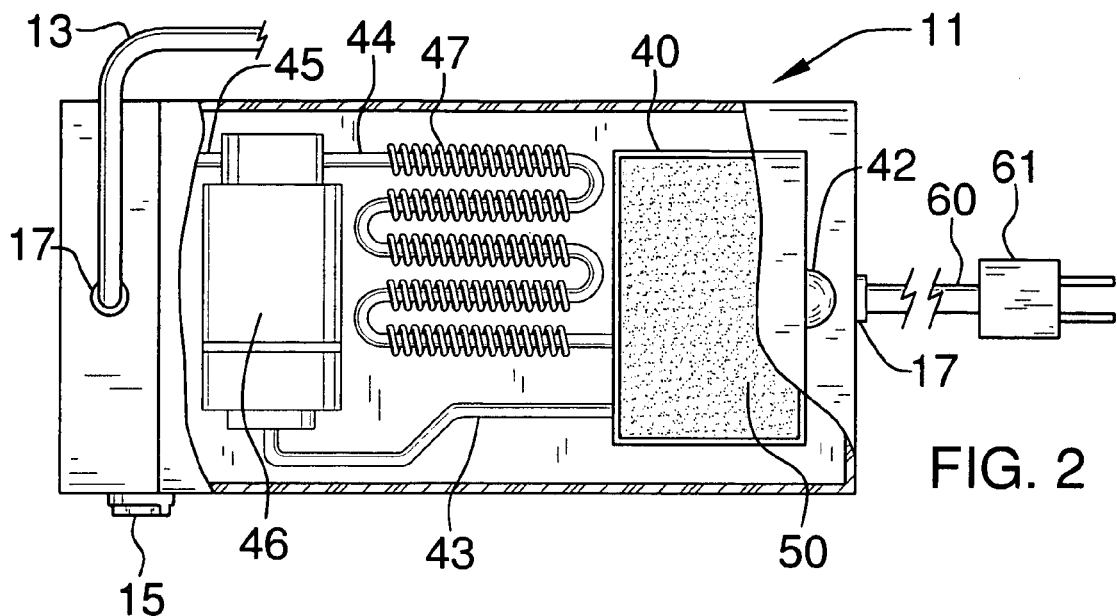
FIG. 2 is a cross sectional top view of the invention base

Referring to FIG. 1, substantially rectangular parallelepiped base 11 of invention 10 connects to brush 12 by delivery tube 13 that passes vertically out of one end of base 11 through grommet 17. Delivery tube 13 exits base 11 from a seamlessly connected rectangularly elevated portion of base 11. Typical plug 61 at opposite end of base 11 connects to and powers base 11 components via electrical cord 60 passing into base 11 through grommet 17. Handle 14 on top of base 11 provides for transport of invention 10. Distal end of base 11, proximal to handle 14, houses reservoir lid 41 and access depression 42 that provide for access to lid 41. Lid 41 provides for filling of reservoir 40 (FIG. 2). On one side of base 11 is pump switch 15. Switch 15 is disposed directly above heating element switch 16. Delivery tube 13 enters brush handle 20 of brush 12 to supply brush head 24 which contain outlet ports 23 (FIG. 3).

Figure 3:
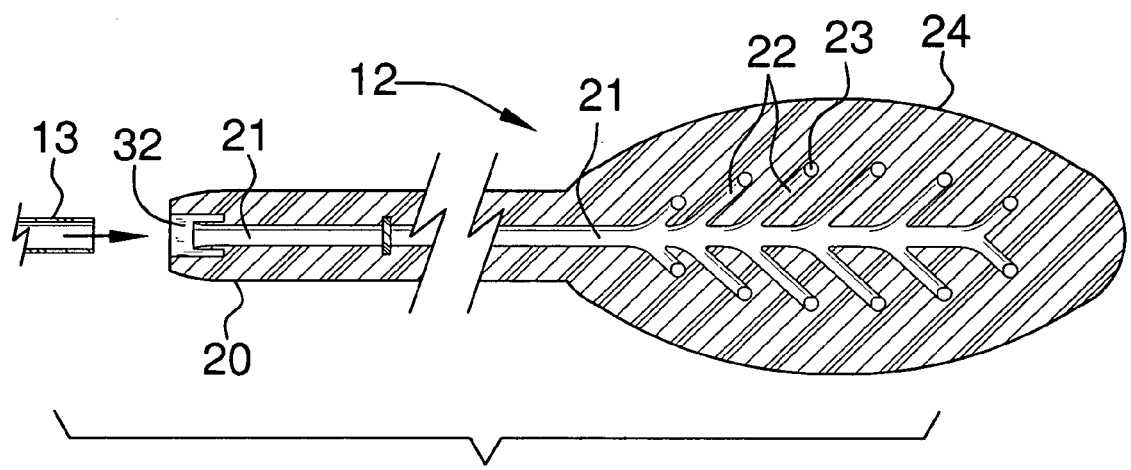
FIG. 3 is a cross sectional top view of the invention brush.
Figure 4A:
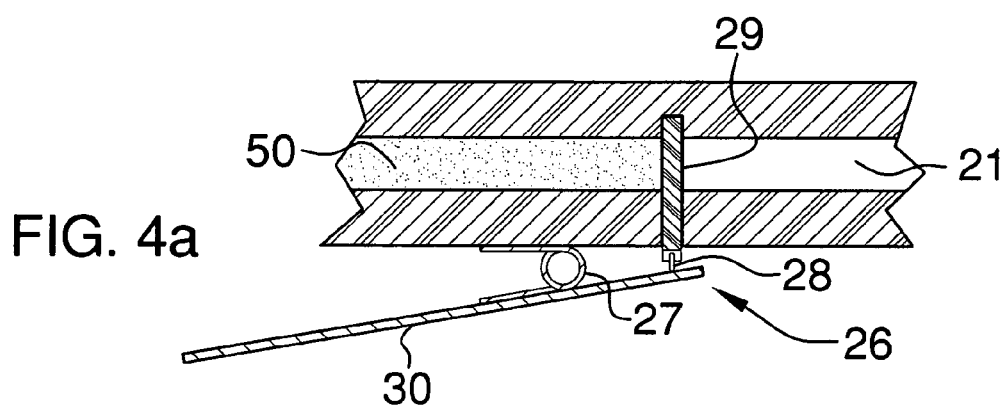
FIG. 4a is cross sectional view of the flow switch in the off position.

Referring to FIGS. 2, 3, and 4a, reservoir 40 is filled with liquid 50. Liquid 50 is pumped by pump 46. Pump 46 draws liquid 50 through area of heating element 47 that substantially surrounds pump input line 44. Pump output line 45 exits pump 46 and supplies delivery tube 13. Excess flow of liquid 50 from pump 46 is channeled back to reservoir 40 via recirculation line 43. From delivery tube 13, liquid 50 passes into main artery 21 of brush handle 20. Tube 13 is connected to main artery 21 in handle 20 via flare/crimp fitting 32. Artery 21 continues from handle 20 into brush head 24 where artery 21 therein feeds a plurality of artery branches 22. Each branch 22 allows liquid 50 outflow via outlet ports 23, when flow switch 26 is opened (FIG. 4b).

Figure 4B:
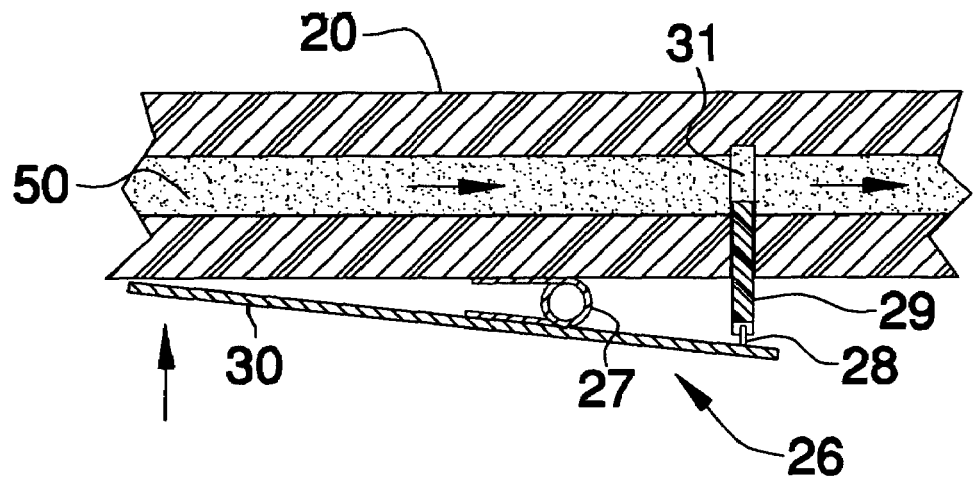
FIG. 4b is cross sectional view of the flow switch in the on position.

Referring to FIG. 4b, lever 30 of switch 26 is held open by pressure of user (not shown). Spring 27 resists opening of gate 29 until activated by user. With activation pressure on lever 30, gate/lever pivot 28 pulls gate 29 partially out of gate channel 31, thereby permitting flow of liquid 50 pushed by pump 46 (FIG. 2).

Figure 5:
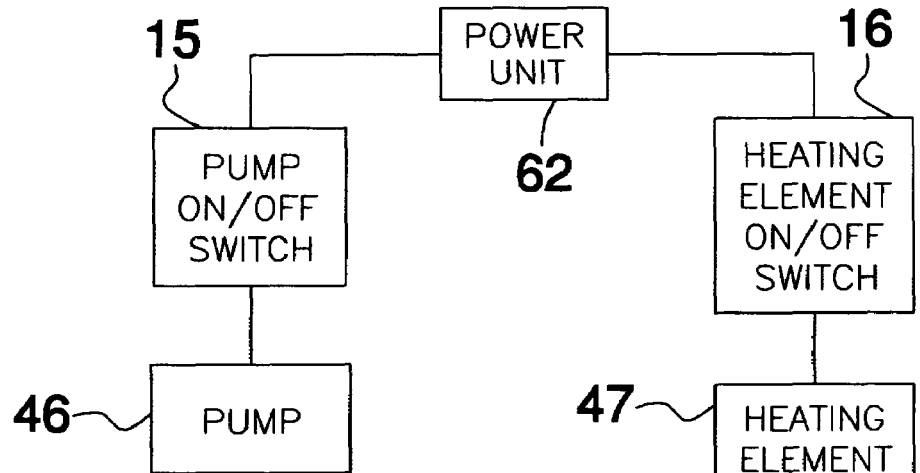
FIG. 5 is an electrical schematic flow chart.

Referring to FIG. 5, power unit 62 provides power to pump switch 15, which in turn provides power to pump 46. Power unit 62 also powers heat switch 16 which in turn powers heating element 47.

Figure 6:
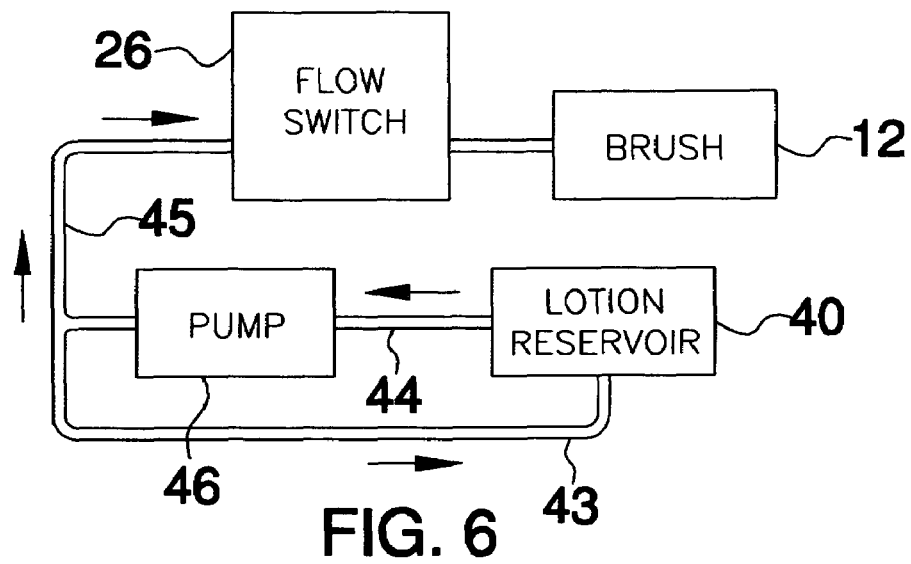
FIG. 6 is a liquid flow chart.

Referring to FIG. 6, reservoir 40 holds liquid 50. On demand from pump 46, liquid flows through pump input line 44 through pump 46 to brush 12 via pressure on manual activation lever 30. Pressure on lever 30 opens gate 29. Closure of gate 29 (FIG. 4a) ceases flow through brush 12 and causes return flow of liquid 50 through recirculation line 43 to reservoir 40.

In use, user inserts plug 61 into standard household outlet (not shown). Lid 41 is lifted from reservoir 40 for insertion of liquid 50. Lid 41 is returned to reservoir 40. User then turns pump 46 on by turning switch 15. Should heated liquid be desired, switch 16 is twisted to on position. User then applies bristles 25 of brush head 24 to head of user or receiver (not shown) by grasping and guiding brush handle 20. Delivery tube 13 flexes appropriately to allow movement of brush 12. By pressing against lever 30 of flow switch 26, liquid 50 flows through main artery 21 of brush handle 20, then through artery 21 of brush head 24 and into artery branches 22, then out of outlet ports 23 into hair of user (not shown). Cessation of pressure on lever 30 closes gate 29 within gate channel 31, thereby ceasing flow of liquid 50 into brush head 24. User utilizes bristles 25 of head 24 to spread or control liquid 50 as desired. Upon completion of chosen tasks, user turns off heat at switch 16 and pump at switch 15. Head 24 of brush 12 is rinsed as desired. Invention 10 is transported via handle 14 for transport or storage. Reservoir 40 is selectively accessed and drained via lid 41 or may remain filled or partially filled. Reservoir 40 is selectively drained and rinsed with water (not shown), if advised for a given liquid 50. Reservoir 40 is filled with water or other solvent (not shown) for rinsing entirety of invention 10.

With respect to the above description then, it is to be realized that the optimum dimensional relationships for the parts of the hair grooming device, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A hair grooming device for grooming hair and applying liquids to hair and head, the device comprised of:
   a base, the base further comprising:
   liquid storage means, wherein the liquid storage means is a reservoir with a removable lid,
   a heating element that surrounds an input line between the liquid reservoir and a pumping means, the heating means further comprises a switch for on/off power of the heating element,
   powering means for the heating element;
   liquid delivery means connecting the base to a brush comprising interchangeable hair contact devices, the brush applying the liquid to the hair and head, wherein the liquid delivery means is flexible tubing,
   the pumping means for delivering the liquid from the liquid storage means to the delivery means and the applicator means,
   powering means for the pumping means.

2. The hair grooming device in claim 1 wherein the base further comprises a switch for on/off power of the pumping means.

3. The hair grooming device in claim 2 wherein the powering means is an electrical cord and a plug utilizing standard household voltage.

4. The hair grooming device in claim 3 wherein the brush further comprises a plurality of liquid delivery ports.

5. The hair grooming device in claim 4 wherein the brush further comprises a handle with a switch for controlling flow of the liquid through the brush and to the delivery ports.

6. The hair grooming device in claim 5 wherein the switch further comprises a lever for controlling the switch.

7. A hair grooming device for grooming hair and applying liquids to hair and head, the device comprised of:
   a substantially rectangular parallelepiped base, the base further comprising:
   a liquid reservoir, the reservoir having a lid and the base having a depression accessing the lid;
   a pump pumping the liquid from the reservoir;
   a heating element heating the liquid, the heating element surrounding a pump input line between the pump and the liquid reservoir;
   an electrical cord and plug powering the pump and the heating element in the base, the plug inserting into standard household electrical outlets;
   the hair grooming device further comprising:
   a flexible delivery tube supplying the liquid from the pump in the base to hair contact means, the hair contact means comprising a brush;
   a main artery in a handle of the brush supplying a plurality of artery branches and outlet ports of the artery branches in a head of the brush.

8. The hair grooming device in claim 7 wherein the base further comprises an on/off switch controlling the heating element.

9. The hair grooming device in claim 8 wherein the base further comprises an on/off switch controlling the pump.

10. The hair grooming device in claim 9 wherein the brush comprises a plurality of varied, interchangeable brushes.

11. The hair grooming device in claim 10 wherein the handle of the brush further comprises a flow switch controlling flow of the liquid through the artery.

12. The hair grooming device in claim 11 wherein the base further comprises a carrying handle.

13. The hair grooming device in claim 12 wherein the pump further comprises a recirculation line returning the liquid from the pump to the reservoir.

* * * * *